United States Patent
Kong et al.

(10) Patent No.: US 6,841,498 B2
(45) Date of Patent: Jan. 11, 2005

(54) CATALYST SYSTEM FOR ETHYLENE (CO) POLYMERIZATION

(75) Inventors: Gapgoung Kong, Sugarland, TX (US); Zhongyang Liu, Port Lavaca, TX (US); Honglan Lu, Port Lavaca, TX (US)

(73) Assignee: Formosa Plastic Corporation, U.S.A., Livingston, NJ (US)

( * ) Notice: Subject to any disclaimer, the term of this patent is extended or adjusted under 35 U.S.C. 154(b) by 163 days.

(21) Appl. No.: 10/365,556

(22) Filed: Feb. 12, 2003

(65) Prior Publication Data

US 2004/0157726 A1 Aug. 12, 2004

(51) Int. Cl.⁷ ............................ B01J 31/00; B01J 37/00; C08F 4/02; C08F 4/60
(52) U.S. Cl. ..................... 502/103; 526/124.5; 556/478; 502/115; 502/123; 502/117
(58) Field of Search ............................... 502/103, 115, 502/117, 123; 526/124.5; 556/478

(56) References Cited

U.S. PATENT DOCUMENTS

| | | | |
|---|---|---|---|
| 3,922,322 A | 11/1975 | Roger et al. ................. 260/878 |
| 4,302,566 A | 11/1981 | Karol et al. ................. 526/125 |
| 4,478,221 A | 10/1984 | Heiss ........................... 526/153 |
| 4,634,786 A | * 1/1987 | Kamienski ................... 556/187 |
| 4,642,328 A | 2/1987 | Morterol et al. ............. 526/125 |
| 4,748,283 A | * 5/1988 | Kamienski ................... 568/851 |
| 4,904,788 A | * 2/1990 | Piotrowski et al. .......... 546/248 |
| 4,987,212 A | 1/1991 | Morterol et al. ........... 526/348.4 |
| 5,047,468 A | 9/1991 | Lee et al. ...................... 525/53 |
| 5,091,353 A | 2/1992 | Kioka et al. ................. 502/111 |
| 5,192,731 A | 3/1993 | Kioka et al. ................. 502/110 |
| 5,260,245 A | 11/1993 | Mink et al. .................. 502/115 |
| 5,336,652 A | 8/1994 | Mink et al. .................. 502/125 |
| 5,352,749 A | 10/1994 | Dechellis et al. .............. 526/68 |
| 5,438,110 A | * 8/1995 | Ishimaru et al. .......... 526/124.5 |
| 5,541,270 A | 7/1996 | Chinh et al. ................... 526/68 |
| 5,561,091 A | 10/1996 | Mink et al. .................. 502/115 |
| 5,583,188 A | * 12/1996 | Kashiwa et al. ........... 526/125.6 |
| 5,990,034 A | 11/1999 | Nozaki ........................ 502/132 |
| 6,121,393 A | * 9/2000 | Kioka et al. .............. 526/124.3 |
| 6,255,515 B1 | * 7/2001 | Kato et al. ................... 556/478 |
| 6,559,088 B1 | * 5/2003 | Shamshoum et al. ........ 502/115 |

FOREIGN PATENT DOCUMENTS

EP 0 703 246 A1 3/1996

* cited by examiner

Primary Examiner—Mark L. Bell
Assistant Examiner—Jennine M Brown
(74) Attorney, Agent, or Firm—Howrey Simon Arnold & White LLP

(57) ABSTRACT

Disclosed is a new titanium based catalyst system for (co)-polymerizing ethylene or ethylene with alpha-olefin having 3 to 10 carbons. The catalyst is obtained by contacting a magnesium halide support with an aluminum compound and with a titanium halide compound and then treating the resulting solid with a magnesium-amide complex. The catalyst system is suitable for producing ethylene polymer and co-polymer with narrow molecular weight distribution as well as improved branching compositional distribution.

18 Claims, No Drawings

CATALYST SYSTEM FOR ETHYLENE (CO) POLYMERIZATION

BACKGROUND OF THE INVENTION

1. Field of the Invention

The present invention relates to a unique titanium-based catalyst system for producing linear low density co-polymers of ethylene. More specifically, present invention relates to a catalyst comprising titanium and magnesium components. The catalyst is useful for producing ethylene polymers having narrow molecular weight distribution and improved branching compositional distribution.

2. Description of Related Art

Polyethylene polymers are well known and are useful in many applications. Linear low density polyethylene co-polymer (LLDPE), having density of 0.910 to 0.945 g/cm$^3$, is produced, primarily using gas phase processes and has been important in commodity and industrial areas over last 20 years. Intense research has been directed to developing high performance LLDPE resins having better impact strength, higher transparency, and less wax content. For example, Super-Hexene, an ethylene co-polymer having hexene as the α-olefin, displays low molecular weight distributions and low compositional distributions. Much effort has been focused on developing new catalyst systems for producing having these properties.

Single site catalyst systems employing organometallic compounds such as metallocene compounds are known to be superior in controlling molecular weight distributions and branching compositional distributions. Unfortunately, it is difficult to apply these catalysts in existing plants, so the use of such systems in gas phase processes for producing LLDPE has been slow to develop. Also, the solubility properties of organometallic compounds (MAOs) lead to less favorable immobilization processes on inorganic supports, further hindering their applicability.

In contrast, supported titanium-based catalysts (Ziegler-Natta catalysts) are directly applicable to existing processes, without modification. Consequently, there has been intensive development of titanium based catalyst systems for improving molecular weight distribution and compositional distribution of LLDPE.

U.S. Pat. No. 4,478,221 and European Patent No. 0 703 246 A1 describe a very common Ziegler-Natta catalyst system. Magnesium metal powder is reacted with butylchloride in a non-polar solvent in the presence of Ti(OR)$_4$. Further treatment with TiCl$_4$/Ti(OR)$_4$/butylchloride results in the formation of a catalyst suitable for gas phase ethylene co-polymerization. However, the LLDPE obtained using this catalyst does not have the narrow molecular weight distribution and compositional distribution that is desired in the newer high performance resins.

Other examples of titanium-based catalysts for traditional LLDPE are described in U.S. Pat. Nos. 5,047,468, 5,091,353, and 5,192,731. U.S. Pat. No. 5,047,468 describes a catalyst system for LLDPE production, which is obtained by dissolving MgCl$_2$ with [TiCl$_3$(AlCl$_3$)$_{1/3}$] in THF to make a solution containing MgCl$_2$ and titanium halide that is subsequently immobilized on silica support. In U.S. Pat. Nos. 5,091,353 and 5,192,731, MgCl$_2$ is dissolved in electron donating solvent and reacted with alkylaluminum compounds to solidify magnesium halide with aluminum alkoxy compounds. Contacting the solid with titanium halide affords a solid catalyst with good morphology and co-polymerization ability.

U.S. Pat. Nos. 5,260,245, 5,336,652, and 5,561,091 describe a catalyst system in which dialkylmagnesium and silane compounds are reacted with —OH group of a silica support which is then contacted with transition metal halide to form relatively homogeneous active site. This catalyst system exhibits more homogeneous ethylene polymerization or co-polymerization capability than traditional magnesium-titanium(IV) halide base catalyst systems. However, this catalyst system requires extra processing steps because the silica support must be treated, either chemically or by heating, to remove bound water and excess —OH groups prior to the formation of the catalyst.

Most of the preparation methods described in the art for the catalytic control of molecular weight distribution and/or branching compositional distribution is geared toward the complicated task of controlling the active site formation process, which in turn requires careful control of the catalyst precipitation process to ensure consistent catalyst properties. Catalyst properties are deteriorated in the absence of such control over the precipitation process. Therefore, a need exists for a simple and efficient process for obtaining magnesium-titanium based catalyst system for controlling narrow molecular weight distribution and improved branching compositional distribution.

SUMMARY OF THE INVENTION

In light of the deficiencies in the art described above, the present invention provides a titanium-based catalyst system that is easy and economical to synthesize and is capable of producing polyethylene polymer and co-polymer having a narrow molecular weight distribution and narrow compositional distribution.

One aspect of the present invention is a magnesium-titanium metal-based catalyst component A that is prepared by:

treating a solid magnesium halide support B with an aluminum compound A-1 which is obtained by reacting alkylaluminum with an amine compound having the formula H$_m$NR$_{3-m}$, where R is an aliphatic or aromatic hydrocarbon having 1 to 14 carbon atoms and m is 1 or 2, incorporating titanium compounds having formula TiX$_n$(OR)$_{4-n}$ onto the treated magnesium halide support to obtain catalyst precursor A', where X is halide, n is less than 5, and R is an aromatic or aliphatic alkyl group, reacting catalyst precursor A' by contacting it with magnesium-amide complex A-2 which is obtained by reacting alkylmagnesium compounds represented by formula RMgR' with aluminum compounds A-1, where R and R' are aliphatic hydrocarbons, to yield component A.

A further aspect of the invention is a catalyst system comprising component A and an organometallic aluminum co-catalyst component C. This catalyst system is useful for polymerizing ethylene or ethylene co-polymer having a narrow molecular weight distribution and narrow compositional distribution.

A further aspect of the present invention is a process for using the catalyst system described above to produce ethylene co-polymers having narrow molecular weight and compositional distributions and improved branching distribution. The process may be either a gas-phase or a slurry process.

DESCRIPTION OF ILLUSTRATIVE EMBODIMENTS

The chemical reactions used to prepare the catalyst system of the present invention are depicted schematically in Scheme 1 and are described in detail below.

Scheme 1:

Eq. (1) $H_mNR_{3-m}$ + $AlR_3$ ----→ A-1

Eq. (2) Mg(s) + RX ----→ $MgX_{2(B,\text{ solid support})}$

Eq. (3) A-1 + $MgX_{2(B,\text{ solid support})}$ ----→ $MgX_{2(\text{treated solid support})}$ Eq. (4) $TiX_n(OR)_{4-n}$ + $MgX_{2(\text{treated solid support})}$ ----→ A'

Eq. (5) RMgR' + A-1 ----→ A-2

Eq. (6) A' + A-2 ----→ Catalyst Component A

Preparation of Aluminum Compounds A-1 (Eq. 1)

Aluminum compounds A-1 containing nitrogen are prepared by reacting an alkylaluminum compound with a primary or secondary amine. The reaction is carried out in a non-polar solvent such as hexane, heptane, or toluene.

Depending on the nature of the amine, the reaction according to Eq. 1 may result in the formation of aluminum-amide bond, as evidenced by the evolution of mild heat and gas (presumably the alkane as it is eliminated) or alternatively, the nitrogen-hydrogen bond of the amine may remain intact and Eq. 1 may produce a Lewis Acid-base adduct of the form $[AlR_3][H_mNR'_{3-m}]$. In either case, the reaction product A-1 is suitable for the following steps in situ without further separation or characterization.

Examples of suitable amine compounds include any compounds having a nitrogen-hydrogen bond, for example, primary amines such as ethylamine, propylamine, butylamine, t-butylamine, hexylamine, heptylamine, or secondary amines including diethylamine, dipropylamine, di-isopropylamine, dibutylamine, di-sec-butylamine, di-tert-butylamine, dihexylamine, dicyclo-hexylamine, piperidine, and aromatic amines including aniline or aniline derivatives such as 2,6-diethylaniline, 2,6-di-tert-butylaniline. Examples of suitable alkylaluminum compounds include compounds containing reactive alkyl-aluminum bonds, for example trimethylaluminum, triethylaluminum, tri-isobutylaluminum, trihexylaluminum, trioctylaluminum or their derivatives. Reaction temperatures can be varied depending on character of amine compounds, but mild reaction temperatures of about 10 to about 40° C. are typical. The molar ratio of alkylaluminum to amine is typically about 0.05 to about 5.

Preparation of Active Magnesium Halide Support Species B (Eq. 2)

As used herein, the term 'active magnesium halide' support refers to magnesium halide that is suitable for catalytic purposes. The support species of the present invention can be prepared using any of the various methods known in the art for preparing magnesium halide. For example, magnesium halide can be synthesized by reacting magnesium metal powder with an alkylhalide in a non-polar solvent in the presence of aluminum alkoxide. This reaction can be initiated using a catalytic amount of $Al(OR')_3$ at high temperature, for example, about 80° C. to about 100° C. Once initiated, continuous reaction between magnesium and alkylhalide is maintained by feeding the alkylhalide with an adequate amount of $Al(OR')_3$ to sustain the reaction until all the magnesium powder is converted to magnesium halide solid. A small amount of an electron donating organic agent such as an ester or an alkoxysilane compound can be used to control particle size of the magnesium halide support. After the magnesium powder is consumed by the reaction, further stirring at between 80° C. and 100° C. for 1–4 hours completes the reaction to form the magnesium halide support.

A spherical magnesium halide support can be obtained by reacting a $R_2Mg$ solution with an alkylhalide in a mixed solvent of ether and heptane, as described in U.S. Pat. No. 4,987,212, the entire contents of which is incorporated herein by reference. A magnesium halide solution in a mixed solvent of alcohol and a hydrocarbon can be reacted with alkylaluminum compounds to produce a magnesium halide support containing aluminum as described in U.S. Pat. No. 5,091,353, the entire contents of which is incorporated herein by reference. U.S. Pat. No. 5,990,034, the entire contents of which is incorporated herein by reference, discloses a method to prepare magnesium halide by reacting alkylmagnesium and alkylaluminum with a chlorosilane compound containing a Si—H bond.

According to another embodiment, an inorganic carrier material such as silica containing a magnesium halide species can be used as a support for the catalyst system of the present invention. For example, U.S. Pat. No. 5,192,731, the entire contents of which is incorporated herein by reference, describes the method to prepare silica containing magnesium halide by contacting the silica with an organoaluminum compound, reacting the resulting species with a solution of magnesium halide dissolved in a hydrocarbon/alcohol solvent, and treating it with a reducing organometallic compound.

Treatment of the Support with A-1 (Eq. 3)

According to one embodiment of the present invention, a magnesium halide support as described above is contacted with aluminum compound A-1. According to one embodiment, this reaction is carried out at a low temperature, for example about 10° C. to about 40° C. for about 6 to about 12 hours in a non-polar solvent. Without being bound by theory, it is presumed that some amount of aluminum complex is loaded onto the surface of magnesium halide support. The support material is then separated and washed with a non-polar solvent.

Reaction of Titanium Halide with the Treated Support to Yield Catalyst Precursor A' (Eq. 4).

According to one embodiment, the treated support is contacted with a titanium halide of the formula, $TiX_n(OR)_{4-n}$. Without being bound by theory, it is presumed that this immobilizes a certain amount of the titanium component on the support. This reaction can be carried out at any temperature but conveniently proceeds at about 10° C. to about 30° C. and is typically completed in about 30 minutes to about an hour in a non-polar solvent. The support can be subsequently washed with hexane or another suitable non-polar solvent. Examples of suitable titanium halides, represented by $TiX_n(OR)_{4-n}$, include titaniumtetrahalide such as $TiCl_4$, $TiBr_4$, $TiI_4$, or alkoxy titanium halide such as $Ti(OCH_3)Cl_3$, $Ti(OC_2H_5)Cl_3$, $Ti(OC_4H_9)Cl_3$, $Ti(OC_8H_{17})Cl_3$, $Ti(OCH_3)_2Cl_2$, $Ti(OC_2H_5)_2Cl_2$, $Ti(OC_4H_9)_2Cl_2$, $Ti(OC_8H_{17})Cl_3$, or tetraalkoxy titanium such as $Ti(OCH_3)_4$, $Ti(OC_2H_5)_4$, $Ti(OC_4H_9)_4$. Among these titanium halide compounds, alkoxytitaniumtrihalides are particularly preferred.

Preparation of Magnesium Amide Compounds A-2 (Eq. 5).

Magnesium-amide complexes A-2 of the present invention can be conveniently prepared from aluminum compounds A-1 immediately following the preparation of A-1 (Eq. 1) by reacting the resulting A-1 mixture from (Eq. 2) with alkylmagnesium. As mentioned above, no separation or purification of the A-1 mixture is required prior to this step. An alkylmagnesium compound according to the formula RMgR' is simply added to A-1 solution resulting from (Eq. 1) and the solution is stirred, for example at room temperature for about 1 hour. Examples of suitable alkylmagnesium compounds include dibutylmagnesium, butyloctylmagnesium, and butylethylmagnesium. The compounds according to A-2 are typically very soluble in non-polar solvents and are stable at room temperature. They can typically be used in situ without further purification or separation.

Preparation of Catalyst Component A (Eq. 6).

After titanium halide compounds are incorporated onto magnesium halide support (Eq. 5), the solid catalyst precursor A' is contacted with magnesium-amide compounds A-2 prepared above (Eq. 5) to yield catalyst A. According to one embodiment, contact reaction with magnesium amide compounds A-2 are carried out at room temperature for about 6 to about 12 hours. Alternatively, the reaction can be preformed at mild temperatures such as about 30° to about 50° C. for about 2 to about 5 hours. The reaction is preferably conducted in non-polar solvents, for example, pentane, hexane, or heptane. Other solvents can be used without deviating from the scope of the invention, but it has been observed that when aromatic solvents such as benzene and toluene are used, activity of the catalyst tends to be decreased.

Organometallic Aluminum Co-catalyst Component C.

The supported catalyst component A prepared above can be combined with ordinary alkylaluminum co-catalysts C to polymerize ethylene. The alkylaluminum co-catalysts are used in an amount that is sufficient to promote the polymerization activities of the solid catalyst component component A. According to one embodiment, the Al/Ti molar ratio is varied from about 2 to about 500, preferably about 2 to about 100, and most preferably from about 2 to about 30. Examples of suitable alkylaluminum catalyst compounds include trialkylaluminums such as triethylaluminum, tributylaluminum, trioctylaluminum, trimethylaluminum, and dialkylaluminum halide such as diethylaluminum chloride, dibutylaluminum chloride, and alkylaluminum sesquichloride such as ethylaluminum sesquichloride, butylaluminm sesquichloride.

Polymerization Using Catalyst Component A and Co-catalyst C.

Catalyst component A in the present invention can be used to polymerize ethylene or co-polymerize ethylene with an alpha-olefin having 3 to 10 carbon atoms, preferably 4 to 10 carbon atoms, in the presence of organometallic aluminum component C. Examples of suitable alpha-olefins having 3 to 10 carbon atoms include propylene, 1-butene, 1-pentene, 1-hexene, 4-methyl-1-pentene, 3-methyl-1-pentene, 1-octene and 1-decene. The polymerization of ethylene or co-polymerization of ethylene with an alpha-olefin can be performed in the liquid (slurry) or vapor phase in the presence or absence of an inert polymerization solvent. The Examples below demonstrate polymerization using a slurry method. This is for convenience and one of skill in the art would recognize that the catalyst system of the present invention is also suitable for any of the gas phase processes known in the art. Examples of suitable gas phase processes are shown in U.S. Pat. Nos. 3,922,322, 5,541,270 and 5,352,749, the entire contents of which are incorporated herein by references.

According to one embodiment, the polymerization temperature is from about 20° C. to 150° C. and the polymerization pressure is from about one to about 100 Kg/cm²-G, especially from 2 to 50 Kg/cm²-G. According to one embodiment, the polymerization or co-polymerization using the catalyst system of present invention is performed in the presence of hydrogen to control the molecular weight of the polymer.

One measure of molecular weight distribution for is melt flow ratio (MFR), which is the ratio of the high load melt index (HLMI or $I_{21.6}$) to the melt index (M.I. or $I_{2.16}$) of a given resin, that is:

MFR=HLMI/M.I.

For a regular resins, MFR values tends to increase as M.I decreases and MFR values tends to decrease as M.I. increases. The melt flow ratio is believed to be an indication of the molecular weight distribution of the polymer and the higher the value, the broader the molecular weight distribution. Resins having relatively low MFR values for a given melt index M.I. typically have relatively narrow molecular weight distributions. Additionally, LLDPE resins having relatively low MFR values produce films of better strength properties than resins with high MFR values.

The catalyst component A of present invention, when used in the presence of ordinary alkylaluminum co-catalyst C, polymerizes ethylene-copolymer having significantly narrower molecular weight distribution and improved branching composition distribution than the co-polymer made with reference catalysts, as indicated by smaller MFR and lower melting point of the resulting co-polymers. Also, the present catalyst component shows improved co-monomer response, indicated by lower density values for resulting polymers, compared to those polymers made using ordinary catalysts under the same co-monomer/ethylene molar ratio. The solid catalyst component A of the present invention is useful for producing ethylene co-polymer resins having densities of about 0.910 to about 0.960 g/cm³ from ethylene and an α-olefin having 3 to 10 carbons.

The following examples are included to demonstrate particular embodiments of the invention. It should be appreciated by those of skill in the art that the techniques disclosed in the examples which follow represent techniques discovered by the inventor to function well in the practice of the invention, and thus can be considered to constitute some of the preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Preparation of magnesium halide support. Magnesium powder (3.2 g), hexane (400 ml), and of iodine (0.23 g) were introduced successively into 1-liter glass flask and the mixture was heated with stirring to 80° C. When the temperature reached 80° C. tri(sec-butoxy)aluminum (0.83 g) and ethylbenzoate (0.94 mL) were introduced rapidly, followed by the slow introduction over 4 hours of n-butylchloride (30 mL). Following the addition of n-butylchloride, the reaction mixture was stirred at 80° C. for 2 more hours and then cooled to room temperature (20° C.). The resulting precipitate was triply washed with 400 mL hexane to obtain the solid magnesium halide support B.

Synthesis of aluminum compounds A-1 and magnesium-amide complexes A-2. A hexane solution of triethylaluminum (100 mmol) was placed in 200 mL flask and dicyclohexylamine (200 mmol) was added slowly over 30 minutes and stirred for 1 hour to yield a pale yellow aluminum solution A-1. A dibutylmagnesium solution in heptane (20 mmol) and a 40 mmol solution of aluminum A-1 were mixed to yield a clear solution A-2 which was used without further separation or purification.

Preparation Catalyst A. Magnesium halide support B (3.0 g) prepared above was placed in 500 mL flask with 150 mL hexane and treated with 6 mmol of aluminum solution A-1. After 6 hour stirring at room temperature, the liquid portion was decanted and the solid was washed with 200 mL hexane. 2-Ethylhexoxytitanium trichloride (15 mmol) was added with 150 mL hexane and the slurry mixture was stirred for 1 hour at room temperature to yield A'. The liquid was decanted and the solid was washed with 500 mL hexane. The volume of hexane was brought to 150 mL and magnesium-amide complex A-2 (3.0 mmol) was added. The mixture was stirred at 40° C. for 3 hours to yield catalyst A. Analysis shows that A contains 3.9% Ti.

Ethylene Polymerization. A 2.0 liter autoclave reactor was purged with nitrogen and charged with 1000 mL of purified hexane. The temperature was raised to 65° C. and (n-$C_8H_{17}$)$_3$Al (2.0 mmol) and of catalyst A (0.05 g) were added under a slow nitrogen purge. The reactor vent was closed and temperature was increased to 85° C. The internal pressure was raised to 16 psi with hydrogen and then ethylene was introduced to maintain total pressure at 90 psi. The polymerization was carried out for 1 hour. Following polymerization, the polymer suspension was filtered and polymer was dried. Polymerization results are summarized in Table 1.

Ethylene/1-hexene Co-polymerization. A 2.0 liter autoclave reactor was purged with nitrogen and charged with 1000 mL of purified hexane. 1-Hexene (60 ml) was added and the temperature was raised to 65° C. (n-$C_8H_{17}$)$_3$Al (2.0 mmol) and catalyst A (0.05 g) were injected under a slow nitrogen purge. The reactor vent was closed, and temperature was increased to 85° C. The internal pressure was raised to 12 psi with hydrogen and then ethylene was introduced to maintain total pressure at 90 psi. The polymerization was carried out for 30 minutes. After polymerization, methanol was added to quench the reaction and the polymer suspension was filtered and dried. Polymerization results are summarized in Table 1.

EXAMPLE 2

Preparation of magnesium halide support B. Solid magnesium halide support containing aluminum was prepared according to U.S. Pat. No. 4,987,212. Hexane (200 mL) was mixed with 172 mL of 0.865 M butyloctylmagnesium solution in heptane and 60 mL of diisoamylether. The reactor was heated to 50° C. and over 3 hours 32 mL of tert-butyl chloride was added, dropwise. Following this addition, the suspension was maintained at 50° C. for 2 hours and the precipitate was washed six times with hexane to yield the solid magnesium halide support.

The procedure of Example 1 was repeated to prepare aluminum compounds A-1, magnesium-amide complexes A-2 and catalyst component A. Ethylene and ethylene/1-hexene polymerization was carried out in the same way as in Example 1 and the results are listed in Table 1.

EXAMPLE 3–5

Preparation of Catalyst Component A. Catalyst component A was prepared in the same way as in Example 1, except 2-ethylhexoxytitanium trichloride was replaced by following titanium compounds:

| Example | Titanium Compound |
| --- | --- |
| 3 | Ti(OBu)$_2$Cl$_2$ |
| 4 | Ti(OBu)Cl$_3$ |
| 5 | Ti(OEt)Cl$_3$ |

Ethylene and ethylene/1-hexene polymerization was carried out in the same way as in Example 1 and the results are listed in Table 1.

EXAMPLE 6

Preparation of Catalyst Component A. Magnesium halide support B and metal-amide complexes A-2 were prepared as described in Example 1. Magnesium support B (3.0 g) was placed in 500 mL flask with 150 mL hexane and then 6 mmol of aluminum compound A-1, (obtained by adding 6 mmol of tert-butylamine to 6 mmol solution of Et$_3$Al at room temperature) was added. The mixture for 6 hours at room temperature and decanted. The remaining solid was washed with 300 mL hexane. TiCl$_3$(2-ethylhexoxy) (15 mmol) was added and the slurry mixture was stirred for 30 minutes at room temperature, decanted, and washed with 500 mL hexane. After make-up of hexane up to 150 mL, 3.0 mmol of magnesium-amide solution A-2 was added followed by stirring at 40° C. for 3 hours to yield catalyst A. Analysis shows that A contains 4.1% Ti. Ethylene and ethylene/1-hexene polymerization was carried out as described in Example 1 and the results are listed in Table 1.

EXAMPLE 7

Preparation of Catalyst Component A. Magnesium halide support B and magnesium-amide complexes A-2 were prepared as described in Example 1. Magnesium support B (3.0 g) was placed in 500 mL flask with 150 mL of hexane and then 6 mmol of aluminum compound A-1 (which was obtained by adding 12 mmol of piperidine to 6 mmol solution of Et$_3$Al at room temperature) was added. The mixture was stirred for 6 hours at room temperature, decanted, and washed with 300 mL hexane. TiCl$_3$(2-ethylhexoxy) (15 mmol) was added and the slurry was stirred for 30 minutes at room temperature, decanted and washed with 500 mL hexane. After make-up of hexane up to 150 mL, 3.0 mmol of metal-amide solution A-2 was added and stirred at 40° C. for 3 hours to yield catalyst A. Analysis shows that A contains 4.0% Ti. Ethylene and ethylene/1-hexene polymerization was carried out as described in Example 1 and the results are listed in Table 1.

EXAMPLE 8–10

Preparation of Catalyst component A. Catalyst (A) was prepared as described in Example 1 except triethylaluminum in the preparation of aluminum compounds A-1 was replaced by the following aluminum compounds:

| Example | Aluminum Compound |
| --- | --- |
| 8 | iso-Bu$_3$Al |
| 9 | n-Octyl$_3$Al |
| 10 | Me$_3$Al |

Ethylene and ethylene/1-hexene polymerization was carried out as described in Example 1 and the results are listed in Table 1.

COMPARATIVE EXAMPLE 1

Magnesium halide support B and metal-amide complexes A-2 were prepared as described in Example 1. Magnesium support B (3.0 g) was placed in 500 mL flask with 150 mL hexane. TiCl$_3$(2-ethylhexoxy) (15 mmol) was added and the slurry mixture was stirred for 1 hour at 50° C. and then decanted and washed with 500 mL hexane. Analysis results shows the catalyst component contains 1.5% Ti. Ethylene and ethylene/1-hexene polymerization was carried out in the same way as in Example 1 and results are listed in Table 1. It is apparent from the table that this catalyst which lacks the treatment with magnesium amide solution A-2 results in lower yield and higher density of polymerization product.

COMPARATIVE EXAMPLE 2

Magnesium halide support B was prepared as described in Example 1. Magnesium support B (3.0 g) was placed in 500 mL flask with 150 mL hexane. (n-octyl)$_3$Al (6 mmol) was added and the mixture was stirred for 6 hours at room temperature. TiCl$_3$(2-ethylhexoxy) (6 mmol) was added and the slurry mixture was stirred for 1 hour at room temperature and then decanted and washed with 500 mL hexane. Analysis results shows it contains 4.2% Ti. Ethylene and Ethylene/1-hexene Polymerization was carried out in the same way as in Example 1 and results are shown in Table 1. The M.F.R. of the polymers made using this comparative catalyst is greater than those prepared using catalyst A, indicating that even though the comparative catalyst and A have similar Ti content, the molecular weight distribution obtained using the comparative catalyst is not as narrow.

COMPARATIVE EXAMPLE 3

A catalyst was prepared according to U.S. Pat. No. 4,748,221. Magnesium powder (3.2 g), 400 mL hexane, and 0.43 g of iodine were introduced successively into 1-liter glass flask and heated to 80° C. Titanium tetrachloride (3.3 g) and tetrapropyltitanate (5.0 g) were added followed by slow addition over 4 hours of 30 mL of n-butylchloride. The mixture was stirred for a further 2 hours at 80° C., and then cooled to 20° C. The solid precipitate was washed with hexane three times to yield comparative catalyst 3. Ethylene and ethylene/1-hexene polymerization was carried out in the same way as in Example 1 and results are listed in Table 1.

TABLE 1

Polymerization Results

| Example | Ethylene Polymerization | | Ethylene/1-hexene polymerization | | |
|---|---|---|---|---|---|
| | Yield(g) | M.I. (2.16) | MFR(*) | M.I. (2.16) | MFR(*) | Density |
| 1 | 106 | 0.61 | 26.5 | 0.95 | 24.3 | 0.9230 |
| 2 | 99 | 0.97 | 26.8 | 1.2 | 24.8 | 0.9220 |
| 3 | 125 | 0.91 | 25.4 | 1.5 | 24.6 | 0.9225 |
| 4 | 117 | 0.96 | 26.6 | 1.7 | 24.4 | 0.9199 |
| 5 | 101 | 0.97 | 26.7 | 1.3 | 24.1 | 0.9235 |
| 6 | 96 | 1.30 | 25.2 | 1.8 | 24.3 | 0.9224 |
| 7 | 121 | 0.65 | 27.6 | 1.1 | 24.5 | 0.9238 |
| 8 | 89 | 0.60 | 27.2 | 0.9 | 25.3 | 0.9225 |
| 9 | 105 | 0.53 | 25.5 | 1.2 | 24.1 | 0.9211 |
| 10 | 102 | 1.05 | 25.1 | 1.5 | 23.9 | 0.9231 |
| Comparative 1 | 89 | 1.15 | 33.6 | 1.52 | 30.2 | 0.9336 |
| Comparative 2 | 143 | 1.91 | 38.2 | 2.5 | 32.2 | 0.9330 |
| Comparative 3 | 109 | 1.31 | 32.1 | 1.62 | 30.2 | 0.9301 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A catalyst component prepared by:
   preparing an aluminum compound by reacting an amine with an alkylaluminum compound;
   treating a solid magnesium halide support with the aluminum compound;
   preparing a catalyst precursor by contacting the treated magnesium halide support with a titanium compound having the formula TiX$_n$(OR)$_{4-n}$, wherein X is a halide, n is 0–4, and R is a C$_{1-14}$ aromatic or aliphatic group;
   preparing a magnesium-amide complex by reacting an alkylmagnesium compound having the formula R$_1$MgR$_1$' wherein R1 and R1' are C$_{1-14}$ aliphatic hydrocarbons with the aluminum compound; and
   contacting the catalyst precursor with the magnesium-amide complex.

2. The catalyst component of claim 1, wherein the magnesium halide support is an active magnesium halide species comprising magnesium and chloride.

3. The catalyst component of claim 1, wherein the magnesium halide species is prepared by reacting magnesium powder with an alkylhalide.

4. The catalyst component of claim 1, wherein the aluminum compound is prepared by adding the amine compound to the alkylaluminum compound and is then added to the magnesium halide support without purification.

5. The catalyst component of claim 1, wherein the amine is selected from the group consisting of primary amines, secondary amines, cyclic amines having 4–14 carbons, and aromatic amines.

6. The catalyst component of claim 1, wherein the amine is selected from the group consisting of ethylamine, propylamine, butylamine, t-butylamine, hexylamine, heptylamine, diethylamine, dipropylamine, di-isopropylamine, dibutylamine, di-sec-butylamine, di-tert-butylamine, dihexylamine, dicyclo-hexylamine, piperidine, 2,6-diethylaniline, 2,6-di-tert-butylanilinecyclopentylamine, cyclohexylamine, cycloheptylamine, cyclooctylamine, aniline, piperidine, pyrrolidine, pyrrole, toluidine, and substituted aniline derivatives.

7. The catalyst component of claim 1, wherein atomic ratio of aluminum to magnesium in the treated magnesium halide support is about 0.05 to about 50.0.

8. The catalyst component of claim 1, wherein the atomic ratio of titanium to magnesium in the catalyst precursor is about 0.01 to about 10.

9. The catalyst component of claim 1, wherein the atomic ratio of aluminum to magnesium in the magnesium-amide complex is about 0.05 to about 10.

10. The catalyst component of claim 1, wherein the atomic ratio of magnesium to titanium in the catalyst precursor is about 0.05 to about 10.

11. The catalyst component of claim 1, where in the alkylmagnesium compound is selected from the group consisting of butyloctylmagnesium, dibutylmagnesium, and butylethylmagnesium.

12. A catalyst composition for olefin polymerization or co-polymerization, the catalyst composition comprising a catalyst component and a co-catalyst, wherein the catalyst component is prepared by preparing an aluminum compound by reacting an amine with an alkylaluminum compound;

treating a solid magnesium halide support with the aluminum compound;

preparing a catalyst precursor by contacting the treated magnesium halide support with a titanium compound having the formula $TiX_n(OR)_{4-n}$, wherein X is a halide, n is 0–4, and R is a $C_{1-14}$ aromatic or aliphatic group;

preparing a magnesium-amide complex by reacting an alkylmagnesium compound having the formula $R_1MgR_1'$ wherein R1 and R1' are $C_{1-14}$ aliphatic hydrocarbons with the aluminum compound, and contacting the catalyst precursor with the magnesium-amide complex; and wherein the co-catalyst is an alkylaluminum compound.

13. The catalyst composition of claim 12, wherein the alkylaluminum compound is selected from the group consisting of triethylaluminum, tributylaluminum, trioctylaluminum, trimethylaluminum, diethylaluminum chloride, dibutylaluminum chloride, ethylaluminum sesquichloride, and butylaluminum sesquichloride.

14. A method of producing a catalyst component for olefin polymerization or co-polymerization, the method comprising:

preparing an aluminum compound by reacting an amine with an alkylaluminum compound, treating a solid magnesium halide support with the aluminum compound;

preparing a catalyst precursor by contacting the treated magnesium halide support with a titanium compound having the formula $TiX_n(OR)_{4-n}$, wherein X is a halide, n is 0–4, and R is a $C_{1-14}$ aromatic or aliphatic group;

preparing a magnesium-amide complex by reacting an alkylmagnesium compound having the formula $R_1MgR_1'$ wherein R1 and R1' are $C_{1-14}$ aliphatic hydrocarbons with the aluminum compound; and contacting the catalyst precursor with the magnesium-amide complex.

15. The method of claim 14, wherein atomic ratio of aluminum to magnesium in the treated magnesium halide support, is about 0.05 to about 50.

16. The method of claim 14, wherein the atomic ratio of titanium to magnesium in the catalyst precursor is about 0.01 to about 10.

17. The method of claim 14, wherein the atomic ratio of aluminum to magnesium in the magnesium-amide complex is about 0.05 to about 10.

18. The method of claim 14, wherein the atomic ratio of magnesium to titanium in the catalyst composition is about 0.05 to about 10.

* * * * *